US007326095B2

(12) United States Patent
Miura et al.

(10) Patent No.: US 7,326,095 B2
(45) Date of Patent: *Feb. 5, 2008

(54) RECYCLING METHOD AND MANUFACTURING METHOD FOR AN IMAGE DISPLAY APPARATUS

(75) Inventors: Tokutaka Miura, Kanagawa (JP); Mitsutoshi Hasegawa, Kanagawa (JP); Masaki Tokioka, Kanagawa (JP); Kazuya Shigeoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/282,720

(22) Filed: Nov. 21, 2005

(65) Prior Publication Data

US 2006/0135027 A1    Jun. 22, 2006

Related U.S. Application Data

(63) Continuation of application No. 10/622,431, filed on Jul. 21, 2003, now Pat. No. 6,988,921.

(30) Foreign Application Priority Data

Jul. 23, 2002 (JP) .............................. 2002-213282

(51) Int. Cl.
*H01J 9/50* (2006.01)
*H01J 9/52* (2006.01)

(52) U.S. Cl. ............................... 445/2; 445/23; 445/24
(58) Field of Classification Search ................ 445/2–3, 445/5–6, 23–25
See application file for complete search history.

(56) References Cited

U.S. PATENT DOCUMENTS

| 4,363,696 A | 12/1982 | Nagakubo et al. .......... 156/653 |
| 5,561,317 A | 10/1996 | Momma et al. ............. 257/620 |
| 5,605,483 A | 2/1997 | Takeda et al. .................. 445/2 |
| 5,827,102 A | 10/1998 | Watkins et al. ................ 445/25 |
| 5,912,531 A | 6/1999 | Hasegawa et al. .......... 313/495 |
| 5,939,824 A | 8/1999 | Kishi et al. .................. 313/495 |
| 5,998,924 A | 12/1999 | Yamamoto et al. ......... 313/496 |
| 6,036,567 A | 3/2000 | Watkins ........................ 445/25 |
| 6,081,247 A | 6/2000 | Bancal .......................... 345/75 |
| 6,160,347 A | 12/2000 | Iwasaki et al. ............. 313/545 |
| 6,283,815 B1 | 9/2001 | Iwasaki et al. ............... 445/41 |
| 6,313,571 B1 | 11/2001 | Hasegawa et al. .......... 313/309 |
| 6,353,288 B1 | 3/2002 | Asano et al. ............... 313/582 |
| 6,409,562 B1 | 6/2002 | Asano et al. ................. 445/2 |
| 6,489,720 B1 | 12/2002 | Gofuku et al. .............. 313/558 |
| 6,559,596 B1 | 5/2003 | Arai et al. ................... 313/553 |

(Continued)

FOREIGN PATENT DOCUMENTS

EP            0 440 470            8/1991

(Continued)

*Primary Examiner*—Mariceli Santiago
(74) *Attorney, Agent, or Firm*—Fitzpatrick, Cella, Harper & Scinto

(57) ABSTRACT

In a recycling method for an image display apparatus including a vacuum container structured by sealing a front panel having a phosphor and a rear panel having an electron emitter for irradiating electrons onto the phosphor, the rear panel is separated from the vacuum container, the electron emitter on the rear panel is recovered, and then the rear panel is sealed again to thereby reconstruct the vacuum container.

9 Claims, 3 Drawing Sheets

U.S. PATENT DOCUMENTS

| | | | |
|---|---|---|---|
| 6,632,113 B1 | 10/2003 | Noma et al. | 445/2 |
| 6,951,494 B2 | 10/2005 | Noma et al. | 445/24 |
| 2002/0180342 A1 | 12/2002 | Yamada et al. | 313/493 |
| 2005/0159068 A1 | 7/2005 | Noma et al. | 445/2 |

FOREIGN PATENT DOCUMENTS

| | | |
|---|---|---|
| EP | 0 959 501 | 11/1999 |
| JP | 64-31332 | 2/1989 |
| JP | 7-192629 | 7/1995 |
| JP | 7-326311 | 12/1995 |
| JP | 8-212909 | 8/1996 |
| JP | 9-237568 | 9/1997 |
| JP | 9-326241 | 12/1997 |
| JP | 10-275579 | 10/1998 |
| JP | 2000-82388 | 3/2000 |
| JP | 2000-113820 | 4/2000 |
| JP | 2000-310955 | 11/2000 |
| JP | 2001-210258 | 8/2001 |
| JP | 2002-182585 | 6/2002 |

RECYCLING METHOD AND MANUFACTURING METHOD FOR AN IMAGE DISPLAY APPARATUS

This application is a continuation of application Ser. No. 10/622,431, filed on Jul. 21, 2003, now U.S. Pat. No. 6,988,921.

BACKGROUND OF THE INVENTION

1. Field of the Invention

The present invention relates to a flat-type image display apparatus structured by arranging a front panel and a rear panel via a frame, and more particularly to a recycling method for an image display apparatus whose life has ended.

2. Related Background Art

In recent years, with development of larger-screen image display apparatuses being underway, so-called flat panel displays that are light and thin have been receiving attention as an alternative to cathode ray tubes (hereinafter, referred to as CRTs) that are bulky and heavy. Examples of the flat panel displays whose research and development are well underway in recent years include a liquid crystal display (hereinafter, referred to as LCD) and a plasma display panel (hereinafter, referred to as PDP). There still remain problems in that the LCD exhibits a low brightness in images and a narrow view angle, and that the PDP exhibits a low contrast. Under such circumstances, there have been growing needs for the flat panel displays that exhibit a high brightness, a high contrast, and a wide view angle as in the conventional CRTs, and that can also meet demands for a larger screen and higher precision.

In view of the above, self light-emitting flat panel displays are also under development, which use an electron beam to cause a phosphor to emit light in the same manner as the conventional CRTs. As one of the self light-emitting flat panel displays, the present inventor has proposed a surface-conduction electron emitter display (hereinafter, referred to as SED) in which an electron source is structured by arranging surface-conduction electron emitters (hereinafter, referred to as SCEs) that are of one type of cold cathodes, instead of conventional hot cathodes, in a matrix shape on a glass plate (see, for example, JP 64-031332 A and JP 07-326311 A).

Any display selected from the above types has a life. Factors determining whether the life has ended are various depending on the types of displays, and can also be various even for a single type of display. In most cases, it is presumed that the life ends when the brightness becomes low. As the currently most widespread display, which is the CRT, is taken as an example, a cathode-forming material changes with time to reduce electron emission efficiency, and then a current made to flow into the phosphor becomes small, thereby reducing the brightness.

In recent years, an influence to environment caused by products has been a growing interest, and more particular attention has been focused on recycling of the products. However, up to now, a display whose brightness becomes low and whose functions as an image display apparatus have been lost is not reused with the most part being disposed of. The recycling of the display is possible in principle by only recycling or replacing degraded parts, but difficult in reality due to the structure, assembly process, cost, etc. of the display, and therefore has not been conducted. It is desired that displays be not only recycled but also produce no waste parts similarly to other products.

SUMMARY OF THE INVENTION

In view of the above problem, the present invention therefore has an object to make it possible to minimize disposal of waste parts and to recycle with ease a display whose luminance becomes low and whose life has ended. More specifically, the present invention aims at reconstructing a display by recycling processing through multiple steps without replacing (disposing) an electron emitter section that is a direct cause of reduction in luminance.

According to the present invention, there is provided a recycling method for an image display apparatus including a vacuum container structured by sealing a front panel and a rear panel with a supporting frame at a predetermined interval, the front panel having an electrode and a phosphor that serve to display an image, the rear panel having an electron emitter for emitting electrons, the recycling method including:

separating the rear panel from the vacuum container;
recovering the electron emitter on the rear panel; and
sealing again the rear panel with the front panel to thereby reconstruct the vacuum container.

Further, according to the present invention, there is provided a manufacturing method for an image display apparatus including a vacuum container structured by sealing a front panel and a rear panel with a supporting frame at a predetermined interval, the front panel having an electrode and a phosphor that serve to display an image, the rear panel having an electron emitter for emitting electrons, the manufacturing method including:

separating the rear panel from the vacuum container of the image display apparatus that is recovered after use;
recovering the electron emitter on the rear panel; and
sealing again the rear panel with the front panel having the electrode and the phosphor that serve to display an image to thereby reconstruct the vacuum container.

DESCRIPTION OF THE PREFERRED EMBODIMENTS

The present invention provides a recycling method for an image display apparatus including a vacuum container structured by sealing a front panel and a rear panel with a supporting frame at a predetermined interval, the front panel having an electrode and a phosphor that serve to display an image, and the rear panel having an electron emitter for emitting electrons. The recycling method includes: separating the rear panel from the vacuum container; recovering the electron emitter on the rear panel; and sealing again the rear panel with the front panel to thereby reconstruct the vacuum container.

In addition, the present invention provides a manufacturing method for an image display apparatus including a vacuum container structured by sealing a front panel and a rear panel with a supporting frame at a predetermined interval, the front panel having an electrode and a phosphor that serve to display an image, and the rear panel having an electron emitter for emitting electrons. The method includes: separating the rear panel from the vacuum container of the image display apparatus that is recovered after use; recovering the electron emitter on the rear panel; and sealing again the rear panel with the front panel having the electrode and the phosphor that serve to display an image to thereby reconstruct the vacuum container.

Further, in the recycling method or manufacturing method described above, recovering the electron emitter preferably includes placing within a hermetic atmosphere the electron emitter on the rear panel separated from the vacuum container and energizing the electron emitter.

Furthermore, in the recycling method or manufacturing method described above, recovering the electron emitter preferably includes disposing within an atmosphere where a carbon compound exists, the electron emitter on the rear panel separated from the vacuum container and energizing the electron emitter.

Further, according to the recycling method or manufacturing method for an image display apparatus described above, it is preferable that an adhesive material for bonding at least one of the rear panel and the front panel to the supporting frame be a low melting point metal.

Further, it is preferable that a main component of the adhesive material be indium.

The recycling method or manufacturing method for an image display apparatus according to the present invention makes it possible to recover the electron emitter on the rear panel and then to recycle the display in a general process for assembling the panel.

Figure 1:
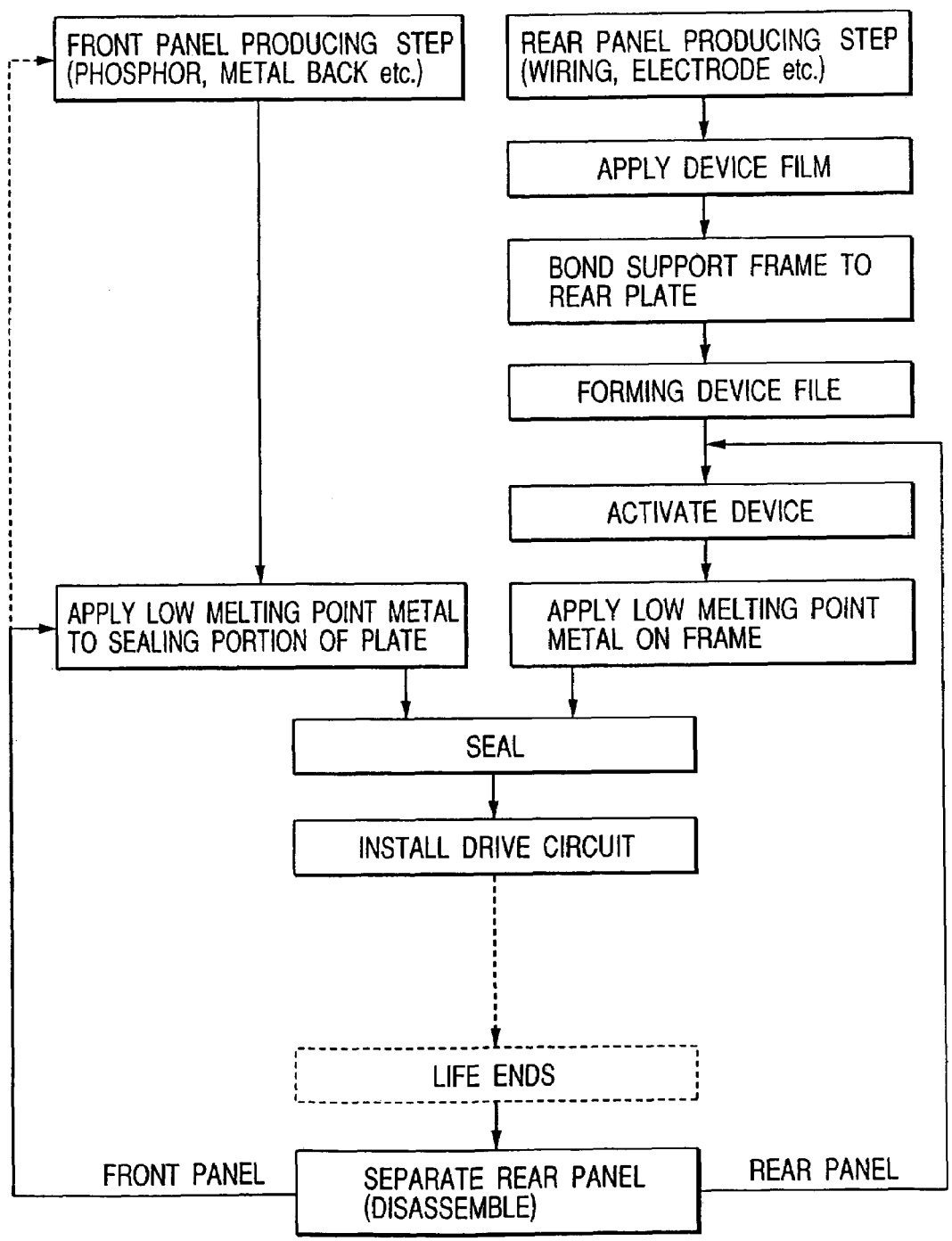
FIG. 1 is a flow chart showing processes for assembling and recycling a display according to the present invention.

FIG. 1 shows a flow of a main process for assembling a display including a recycling process according to the present invention. The recycling process indicated by wide lines is added to a conventional process for the display.

Figure 3:
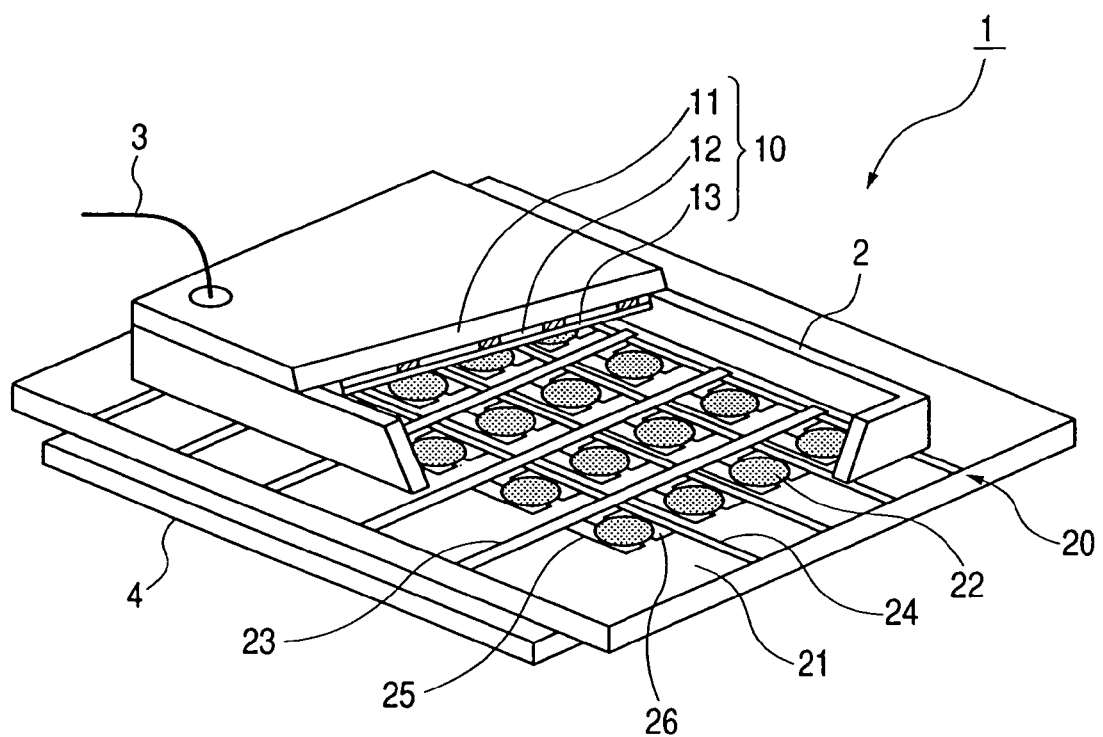
FIG. 3 is a schematic view showing an example of a flat panel display (SED) using an SCE.

FIG. 3 is a schematic perspective view of an SED, whose portion is cut out for explanation. The SED is composed of a vacuum container 1 and a drive circuit 4 forming an IC group for driving SCEs. The vacuum container 1 is structured by arranging and sealing a front panel 10 for displaying an image and a rear panel 20 with a supporting frame 2 at a predetermined interval. The front panel 10 includes a phosphor 12, a metal back 13, and a high-voltage terminal 3, which are formed on a front glass plate 11. The rear panel 20 includes electrodes 25, electrodes 26, an SCE 22, and an X wiring 23 and Y wiring 24 for driving the SCE 22, which are formed on a rear glass plate 21. Note that the vacuum container 1 is hereinafter referred to as a display panel 1.

It is preferable that the front panel 10 or the rear panel 20 be bonded to the supporting frame 2 with a low melting point metal. Accordingly, the front panel 10 and the rear panel 20 can easily be separated from the display panel 1 by heating the display panel 1 at a low temperature. As the low melting point metal, various options including an alloy are available. However, indium is particularly preferable in consideration of a sufficiently low melting point, stability with respect to an ultra-high vacuum (vapor pressure), compatibility with glass (wettability), absence of toxicity, wide availability, etc.

In the case of the SED, some modes can be conceived as the cause of reduction with time in emission. A principal mode is disappearing carbon from an electron-emitting region of the SCE. Carbon is used for increasing emission efficiency of the SCE, and is deposited on the electron-emitting region by an energization operation in an organic atmosphere, which is called an activation operation. Therefore, the SCE whose emission has been reduced can recover the emission by being subjected to the activation operation again, and having carbon deposited on the electron-emitting region again.

A casing, the drive circuit, etc. are removed before separating the rear panel. The display panel 1 is heated in a vacuum and indium is remelted, to thereby disassemble the display panel 1. The SCE whose emission has been reduced on the separated rear panel is recovered by the activation operation and recovers the emission. The recycled rear panel is applied with indium, and then sealed with the separated front panel again in a vacuum to thereby be assembled together with the drive circuit as the display.

EMBODIMENT

With reference to the flow of FIG. 1, detailed description will be made of a process for the SED to which the present invention is applied.

(Front Panel Producing Step)

As the front glass plate 11, 2.8 mm-thick glass of PD-200 (manufactured by Asahi Glass Co., Ltd.) that is low in the content of alkaline components is used. After the front glass plate 11 is sufficiently washed, 0.1 µm of ITO (indium-tin oxide) is deposited thereon by sputtering to form a transparent electrode. Subsequently, a phosphor film is applied thereto by printing, and surface smoothing processing called filming is performed to form the phosphor 12. Note that the phosphor 12 is structured by arranging stripe-shaped phosphors in three colors of red, green, and blue so as to be spaced alternately with black conductive materials (black stripes). In addition, the metal back 13 is formed using an aluminum thin film on the phosphor 12 to have a thickness of 0.1 µm by sputtering.

(Rear Panel Producing Step)

As the rear glass plate 21, 2.8 mm-thick glass of PD-200 (manufactured by Asahi Glass Co., Ltd.) that is low in the content of alkaline components is used after a $SiO_2$ film with a thickness of 100 nm is applied to the glass as a sodium blocking layer, followed by baking.

The electrodes 25 and the electrodes 26 are formed by first forming a titanium film with a thickness of 5 nm as an undercoating layer on the rear glass plate 21 and a platinum film with a thickness of 40 nm thereon by sputtering and then applying a photoresist thereto, and performing patterning by a series of photolithography including exposure, development, and etching.

Next, the Y wiring 24 is formed to have a linear pattern so as to contact one group of the electrodes 25 and the electrodes 26 and couple them. Silver photo paste ink, which is used as the material, is screen-printed and then dried, and exposed and developed to have a predetermined pattern. After that, the Y wiring 24 is formed by baking at 480° C. to obtain a thickness of approximately 10 µm and a width of 50 µm. Note that a terminal end thereof has a larger width for the use as an output electrode.

Next, an interlayer insulating layer is disposed in order to insulate the X wiring 23 and the Y wiring 24. Under the X wiring 23 formed at a later step, the interlayer insulating layer is formed so as to cover intersections between the X wiring 23 and the Y wiring 24 previously formed, and to enable electrical connection between the X wiring 23 and the other group of the electrodes 25 and the electrodes 26 (hereinafter, referred to as "the other electrode group") by forming contact holes in connection portions thereof. As a step, photosensitive glass paste whose main component is PbO is screen-printed, and then exposed/developed. After this step is repeated four times, the baking at 480° C. is performed. The interlayer insulating layer has an entire thickness of approximately 30 µm and a width of 150 µm.

The X wiring 23 is formed by the following steps. That is, silver paste ink is screen-printed on the interlayer insulating layer previously formed, and then dried. After the same process is again performed thereon for double coating, the baking at 480° C. is performed. The X wiring 23 intersects with the Y wiring 24 via the interlayer insulating layer, and is connected to the other electrode group at the contact holes of the interlayer insulating layer. The electrodes in the other electrode group are coupled to each other by the X wiring 23, and collectively function as a scanning electrode after completion of the panel. The X wiring 23 has a thickness of approximately 15 µm.

(Applying Device Film)

The SCE (device film) 22 is applied between the electrodes 25 and the electrodes 26 by an ink jet method. The device film is formed using a solution containing organic-palladium obtained by dissolving 0.15 wt % of palladium-proline complex in an aqueous solution containing water and isopropyl alcohol (IPA) at a ratio of 85:15. Then, the device film is formed into palladium oxide (PdO) by baking the resultant plate in the air at 350° C. for 10 minutes. The device film has a diameter of approximately 60 µm and a maximum width of 10 nm.

(Bonding Supporting Frame to Rear Panel)

The supporting frame 2 is bonded to an outer periphery of an electrode section (corresponding to an image display area of the front panel 10) of the rear panel 20. The supporting frame 2 is made of PD-200 as in the rear panel 20. In this embodiment, the adhesive material adopts low melting point glass frit LS-7105 manufactured by Nippon Electric Glass, Co., Ltd., and is baked in the atmosphere at 450° C. Note that the supporting frame 2 can be attached to the front panel 10. Also, the adhesive material is not limited to the frit but the same low melting point metal as used in sealing may be used.

(Forming Device Film)

The device film 22 formed on the rear panel 20 is caused to have fissure in an inside thereof by being subjected to the energization operation in a reducing atmosphere which is called a forming operation, thereby obtaining an electron-emitting region. More specifically, a cap is used to cover the entirety of the rear panel 20 except an output electrode section (outer periphery of the X wiring 23 and the Y wiring 24) in the periphery of the rear panel 20. The cap is connected to a vacuum pumping system and a gas introducing system, and is structured so as to be able to be filled with a low-pressure hydrogen gas in an inside thereof. A voltage is applied between the X wiring 23 and the Y wiring 24 from an external power supply through an electrode terminal to energize the electrodes 25 and the electrodes 26. Accordingly, the device film 22 is caused to locally break, deform, or alter, thereby obtaining the electron-emitting region having an electrically high resistance. At this time, reduction is accelerated due to hydrogen, and then the device film 22 is changed from a palladium oxide (PdO) film into a palladium (Pd) film.

(Activating Device)

The SCE that has undergone the forming operation is extremely low in electron emission efficiency. In order to raise the electron emission efficiency, the SCE is subjected to an operation called an activation operation. In the activation operation, the cap is used as in the forming operation for a device film to form a vacuum space in which an organic compound exits under an appropriate pressure, and a pulse voltage is applied repeatedly to the electrodes 25 and the electrodes 26 through the X wiring 23 and the Y wiring 24 from the external power supply. Accordingly, carbon or a carbon compound derived from the organic compound is deposited in the vicinity of the fissure as a carbon film. In this step, tolunitrile is used as a carbon source, and introduced through a slow leak valve into the vacuum space, which is applied with a voltage while being kept at $1.3 \times 10^{-4}$ Pa.

(Applying Low Melting Point Metal)

Each of the front panel 10 and the rear panel 20 is placed on a hot plate heated to approximately 120° C., and a sealing portion thereof is applied with indium melted in an electric crucible. An indium film thus applied has a width of 4 mm and a height of 0.3 mm.

(Sealing)

The front panel 10 and the rear panel 20 are placed inside a vacuum chamber so as to face each other with a gap of several mm therebetween. In this embodiment, the front panel 10 is fixed on a lower hot plate, and the rear panel 20 is fixed on an upper hot plate that moves vertically. In this state, temperatures of the front panel 10 and the rear panel 20 are heated to 300° C., and both the panels are subjected to degassing. In this embodiment, the temperatures are kept at 300° C. for 10 hours. After that, the temperatures of both the panels are lowered to a sealing temperature of 180° C., and the upper hot plate on which the rear panel 20 is fixed is moved downward. As a result, the display panel 1 is attained.

(Installing Drive Circuit)

A television set is structured by mounting the display panel 1 that has undergone the sealing to the casing into which the drive circuit 4 is built.

The image display apparatus is manufactured as described above.

The above-mentioned image display apparatus, which has been used and whose life has ended, is recovered and recycled as described below.

(Separating Rear Panel)

The display panel 1 is detached from the casing and the drive circuit 4. At this time, reuse of cables, which have been directly attached to leading end portions of the X wiring 23 and the Y wiring 24 of the display panel 1 through anisotropic conductive films as the adhesive materials, is abandoned because the adhered anisotropic conductive films make it difficult to bond the cables again. The display panel 1 as a single member is placed in the vacuum chamber used for the sealing in the same state as when the sealing is completed (state where the upper hot plate is lowered). The temperatures of the upper hot plate and the lower hot plate at this time are 100° C. or less, which is sufficiently lower than the melting point of indium. After that, the temperatures are raised to approximately 200° C., and the upper hot plate (rear panel 20) is moved upward slowly while being kept at 200° C., thereby separating the rear panel 20.

Also, as a cause of reduction in luminance, deterioration of the phosphor 12 on the front panel 10 is conceivable. In that case, the front panel 10 can be replaced in a process indicated by a dotted line of FIG. 1. Note that the phosphor 12 is difficult to solely replace, so that the deteriorated front panel 10 is disposed of, and another front panel 10 is used.

Also, the supporting frame 2 is bonded to the rear panel 20 in FIG. 1. However, the supporting frame 2, which may be bonded to any one of the front panels 10 and the rear panel 20, can be bonded to the front panel 10 as shown in FIG. 2.

According to this embodiment, since the basic factor of reduction in emission of the SCE is disappearing carbon from the electron-emitting region of the SCE, the separated rear panel 20 is fed back to the above-mentioned activation operation, to thereby be recycled. However, in the case where damage to the SCE itself (such as deformation of the device film electron-emitting region) is recognized as the factor of reduction in emission, the device film 22 can be applied again to the electrodes 25 and the electrodes 26, and also can be fed back to the device film application process (loop indicated by a dotted-line arrow of the FIG. 2).

Figure 2:
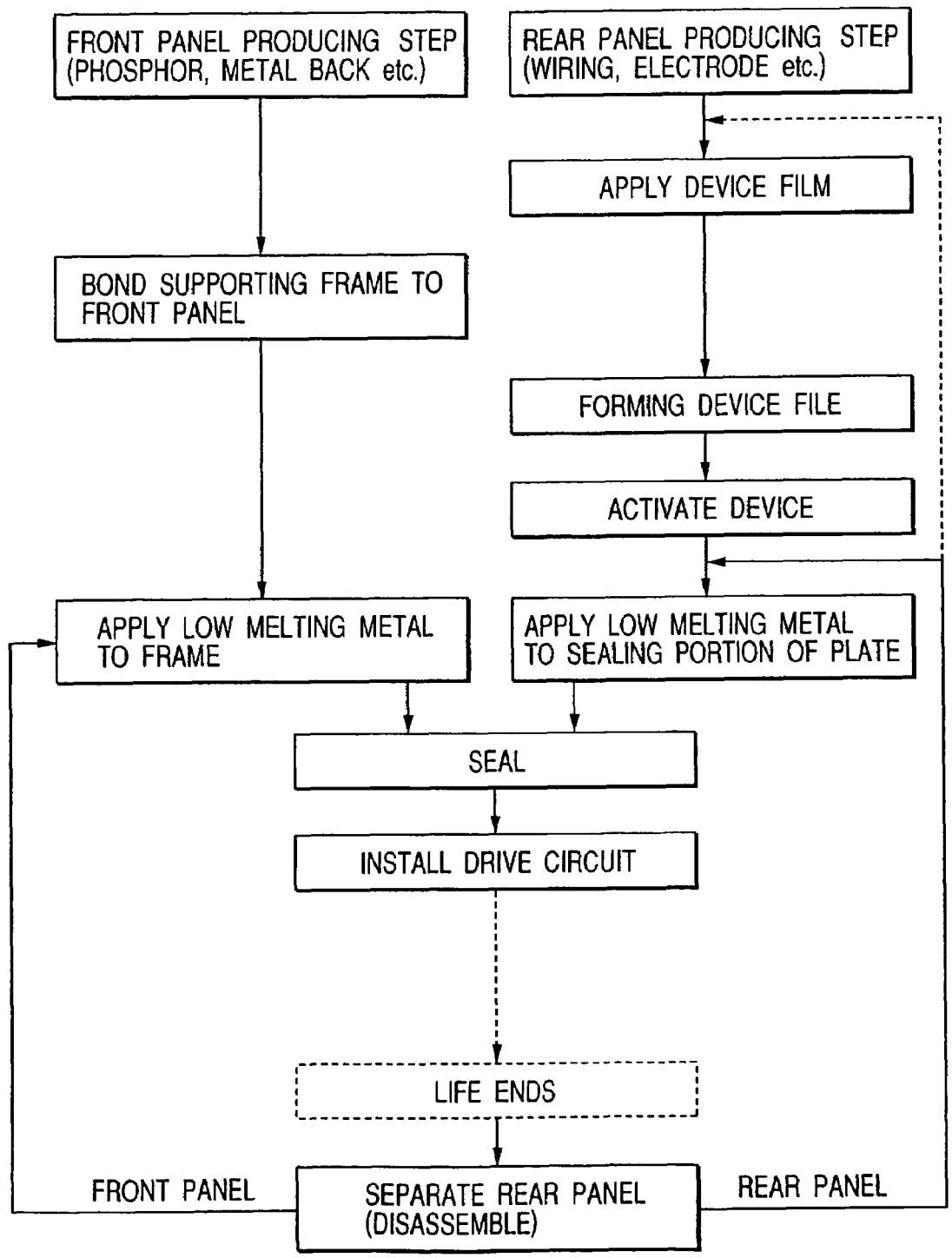
FIG. 2 is a flow chart showing processes for assembling and recycling a display according to the present invention.

Further, in the case where the SCE and the phosphor 12 are both the cause of reduction in luminance, a process obtained by combining that of FIG. 1 and that of FIG. 2 is adopted. Accordingly, a new display can be structured by replacing the front panel 10 and recovering the rear panel 20 (strictly, the SCE on the rear panel 20).

According to this embodiment, as described above, the electron emitter is recycled by the activation process. Then, based on the above-mentioned manufacturing method for a display, the image display apparatus is manufactured by the same steps as above: bonding the supporting frame 2 to the rear panel 20; applying the low melting point metal; sealing; and installing the drive circuit.

As has been described above, according to the present invention, it is possible to minimize the disposal of waste parts and to recycle with ease the display whose luminance becomes low and whose life has ended. That is, it is possible to reconstruct the display by the recovering processing through the multiple steps without replacing (disposing) the electron emitter section that is the direct cause of reduction in luminance.

What is claimed is:

1. A recycling method for an image display apparatus including a vacuum container structured by sealing a front panel and a rear panel with a supporting frame at a predetermined interval, the front panel having an electrode and a phosphor that serve to display an image, the rear panel having an electron emitter for emitting electrons, the method comprising the steps of:

separating the rear panel from the vacuum container;

recovering the electron emitter on the rear panel, with the recovering step including application of a voltage to the electron emitter; and sealing the rear panel with another front panel.

2. A recycling method for an image display apparatus according to claim 1, wherein an adhesive material for bonding at least one of the rear panel and the front panel to the supporting frame is a low melting point metal.

3. A recycling method for an image display apparatus according to claim 2, wherein a main component of the adhesive material is indium.

4. A recycling method for an image display apparatus according to claim 1, wherein recovering the electron emitter includes placing within a hermetic atmosphere the electron emitter on the separated rear panel and energizing the electron emitter, and wherein application of voltage is performed while the electron emitter on the separated rear panel is placed within a sealed atmosphere.

5. A recycling method for an image display apparatus according to claim 1, wherein recovering the electron emitter includes disposing within an atmosphere where a carbon compound exists the electron emitter on the separated rear panel and energizing the electron emitter, and wherein application of voltage is performed while the electron emitter on the separated rear panel is placed within a sealed atmosphere containing carbon.

6. A manufacturing method for an image display apparatus including a vacuum container structured by sealing a front panel and a rear panel with a supporting frame at a predetermined interval, the front panel having an electrode and a phosphor that serve to display an image, the rear panel having an electron emitter for emitting electrons, the manufacturing method comprising the steps of:

separating the rear panel from the vacuum container of the image display apparatus that is recovered after use;

recovering the electron emitter on the rear panel, with the recovering step including application of a voltage to the electron emitter; and sealing the rear panel with another front panel.

7. A manufacturing method for an image display apparatus according to claim 6, wherein an adhesive material for bonding at least one of the rear panel and the front panel to the supporting frame is a low melting point metal.

8. A manufacturing method for an image display apparatus according to claim 6, wherein recovering the electron emitter includes placing within a hermetic atmosphere the electron emitter on the separated rear panel and energizing the electron emitter, and wherein application of voltage is performed while the electron emitter on the separated rear panel is placed within a sealed atmosphere.

9. A manufacturing method for an image display apparatus according to claim 6, wherein recovering the electron emitter includes disposing within an atmosphere where a carbon compound exists the electron emitter on the separated rear panel and energizing the electron emitter, and wherein application of voltage is performed while the electron emitter on the separated rear panel is placed within a sealed atmosphere containing carbon.

* * * * *